A. BERGLUND.
TRAP HOOK.
APPLICATION FILED JULY 21, 1916.

1,217,689. Patented Feb. 27, 1917.

Inventor
August Berglund.

Witnesses

By Victor J. Evans.
Attorney

UNITED STATES PATENT OFFICE.

AUGUST BERGLUND, OF SAGINAW, MINNESOTA, ASSIGNOR OF ONE-HALF TO ANDREW GODENIUS, OF SAGINAW, MINNESOTA.

TRAP-HOOK.

1,217,689.  Specification of Letters Patent.  Patented Feb. 27, 1917.

Application filed July 21, 1916. Serial No. 110,589.

*To all whom it may concern:*

Be it known that I, AUGUST BERGLUND, a citizen of the United States, residing at Saginaw, in the county of St. Louis and State of Minnesota, have invented new and useful Improvements in Trap-Hooks, of which the following is a specification.

This invention relates to fish hooks and more particularly to that class of fish hooks which are known as trap hooks.

The present invention has for its object to produce a trap hook of very simple construction having hooks provided with resilient shanks, means for placing the shanks under tension so as to set the hooks for the victim, and means for releasing the hooks so as to engage the mouth of the victim that swallows the bait.

A further object of the invention is to produce a trap hook having a flexible coat or cover whereby it will be protected against interference by weeds and the like.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Corresponding parts in the several figures are denoted by like characters of reference.

Figure 1:
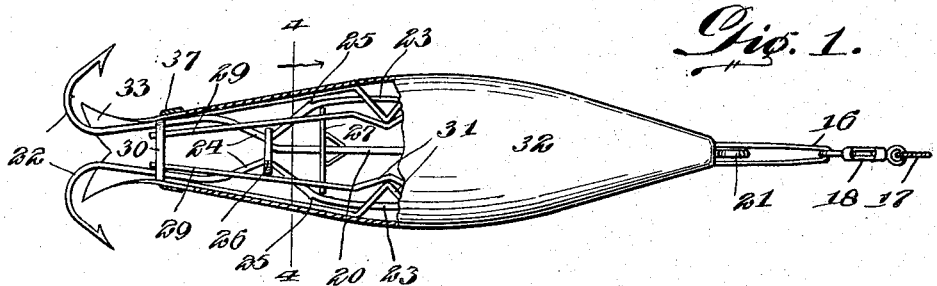
Figure 1 is a side view of the improved trap hook, a portion of the flexible cover being removed.
Figure 2:
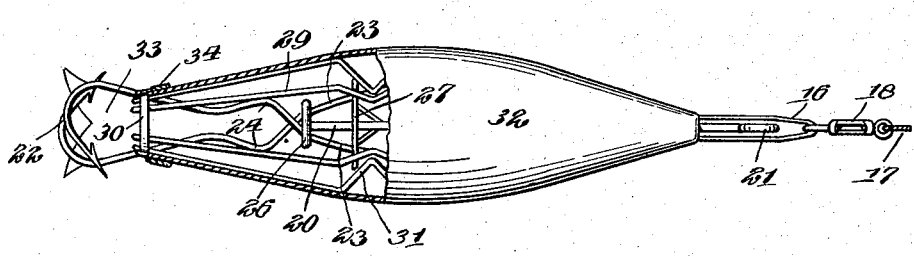
Fig. 2 is a side view showing the trap hook set.
Figure 3:
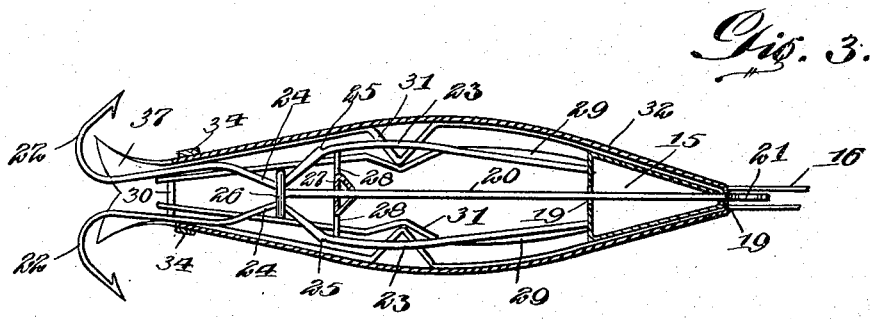
Fig. 3 is a longitudinal sectional view taken on the line 3—3 in Fig. 1.
Figure 4:
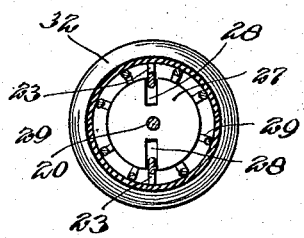
Fig. 4 is a transverse sectional view taken on the line 4—4 in Fig. 1.

The body portion of the device which is designated by 15 is of conical shape, said body portion being provided at the apex thereof with a loop 16 with which the line, a portion of which is shown at 17, may be connected by means of a swivel 18. The body portion 15 has an axial bore 19 for the passage of a longitudinally slidable rod 20 having at one end a handle 21 which is disposed within the loop 16. A pair of hooks 22 are provided with elongated resilient shanks 23 which are secured to the body member 15 at diametrically opposite sides thereof. The shanks 23 are provided intermediate the ends thereof with bent portions forming V-shaped yokes 24 adjacent to which notches 25 are formed. The shanks are embraced by an eye 26 formed at the outer end of the rod 20, the resiliency of the shanks 23 serving to spread the said shanks and the hooks at their outer ends normally apart or outwardly with respect to each other, the eye 26 being normally seated in the angles of the yoke 24. Suitably fixed on the rod 20 near the eye 26 and between said eye and the body member 15 is a disk 27 having diametrically opposite notches 28 to receive the shanks 23 when the trap is set.

The shank portions 23 of the hooks and the longitudinally slidable rod 20 are surrounded by a cage composed of a plurality of longitudinally disposed slightly arcuate resilient rods or wires 29 connected at one end with the base portion of the conical body member 15. The outer ends of the rods 29 terminate a short distance from the hooks 22, and said outer ends are connected together and spaced apart by an elastic band 30. Each of the rods 29 is provided intermediate the ends thereof with an inwardly bent portion forming a substantially V-shaped yoke 31.

The parts of the device are so arranged and proportioned that when the sliding rod 20 is pulled lengthwise through the body member 15 in the direction of the apex of the latter, the eye 26 will engage the inclined limbs of the yokes 24, thereby forcing the resilient hook carrying shanks in the direction of each other until the eye 26 becomes seated in the notches 25, thereby retaining the hooks in "set" position. By the lengthwise movement of the rod 20 just described and which may be designated as a backward movement, the disk 27 is moved in a backward direction until it engages the inclined forwardly disposed limbs of the V-shaped yokes 31 of the cage bars 29. When the bars 29 are forced inward, in the direction of the axis of the rod 20, as would naturally result when the victim closes its mouth on the bait, the disk 27 will be forced in a forward direction by the action of the inclined limbs of the yokes 31, thereby moving the rod 20 in a forward direction, releasing the eye 26 from the notches 25 and permitting the resilient shanks 23 to move outward, thereby spreading the hooks 22 in the mouth of the victim. As the resilient shanks 23 expand the eye 26 will slide unobstructedly until it becomes seated in the angles of the yokes 24.

Connected with the body portion 15 and extending lengthwise of the device outside the cage which is formed by the bars 29 is a coat or covering 32 which is constructed of rubber sheeting or other suitable flexible and water-proof material, said cover being slit lengthwise to produce flaps 33 which are connected together to the rearward of the hooks 22 by an elastic band 34. This external covering device constitutes a protector whereby the trap hook is guarded against interference by weeds and the like which by impinging directly on the resilient bars 29 might spring the trap. The accidental springing of the trap which is one of the most serious inconveniences of trap hooks as ordinarily constructed is thus guarded against and overcome.

Having thus described the invention, what is claimed as new, is:—

1. A trap hook comprising a conical body member, resilient hook carrying shanks fixed thereon and having angular yokes, a rod slidable longitudinally through the body portion and having an eye embracing the shanks, and notches in the shanks adjacent to the angular yokes adapted to be engaged by the eye, said sliding rod having a disk provided with notches adapted to receive the resilient shanks; in combination with means for moving the slidable rod lengthwise to unseat the eye from the notches in the hook carrying shanks.

2. A trap hook comprising a conical body member, resilient hook carrying shanks fixed thereon and having angular yokes, a rod slidable longitudinally through the body portion and having an eye embracing the shanks, and notches in the shanks adjacent to the angular yokes adapted to be engaged by the eye; in combination with a cage comprising a plurality of longitudinally disposed bars fixed at one end on the body member and having V-shaped yokes adapted to engage the disk on the longitudinally slidable rod to move the latter lengthwise, thereby unseating the eye from the notches in the hook carrying shanks.

3. A trap hook comprising a conical body member, resilient hook carrying shanks fixed thereon and having angular yokes, a rod slidable longitudinally through the body portion and having an eye embracing the shanks, and notches in the shanks adjacent to the angular yokes adapted to be engaged by the eye; in combination with a cage comprising a plurality of longitudinally disposed bars fixed at one end on the body member and having V-shaped yokes adapted to engage the disk on the longitudinally slidable rod to move the latter lengthwise, thereby unseating the eye from the notches in the hook carrying shanks; the resilient bars of the cage being terminally connected with and spaced apart by an elastic band.

4. In a trap hook, a conical body portion having a loop at the apex thereof and provided with an axial bore, a rod slidable therethrough and having a terminal eye, and a disk spaced therefrom, said disk having diametrically opposite notches, resilient hook carrying shanks fixed on the base, embraced by the eye of the slidable rod and adapted to engage the notches in the disk, said shanks having angular yokes and notches adjacent thereto, a cage surrounding the hook carrying shanks and the slidable rod, said cage comprising a plurality of bars fixed on the base of the conical body member and having V-shaped yokes lying in the path of the disk on the slidable rod, an elastic band connected with and spacing apart the forward ends of the cage bars, and a flexible coat surrounding the cage.

5. In a trap hook, a conical body portion having a loop at the apex thereof and provided with an axial bore, a rod slidable therethrough and having a terminal eye, and a disk spaced therefrom, said disk having diametrically opposite notches, resilient hook carrying shanks fixed on the base, embraced by the eye of the slidable rod and adapted to engage the notches in the disk, said shanks having angular yokes and notches adjacent thereto, a cage surrounding the hook carrying shanks and the slidable rod, said cage comprising a plurality of bars fixed on the base of the conical body member and having V-shaped yokes lying in the path of the disk on the slidable rod, an elastic band connected with and spacing apart the forward ends of the cage bars, and a flexible coat surrounding the cage, said coat having longitudinal slits producing flaps, and an elastic band connecting said flaps.

In testimony whereof I affix my signature.

AUGUST BERGLUND.

Copies of this patent may be obtained for five cents each, by addressing the "Commissioner of Patents, Washington, D. C."